(12) United States Patent
Kim

(10) Patent No.: US 6,855,661 B2
(45) Date of Patent: Feb. 15, 2005

(54) CATALYST FOR PURIFICATION OF DIESEL ENGINE EXHAUST GAS

(75) Inventor: Young-Nam Kim, Pohang-shi (KR)

(73) Assignee: KH Chemicals Co., LTD, Seoul (KR)

( * ) Notice: Subject to any disclaimer, the term of this patent is extended or adjusted under 35 U.S.C. 154(b) by 0 days.

(21) Appl. No.: 09/958,069

(22) PCT Filed: May 22, 2001

(86) PCT No.: PCT/KR01/00845

§ 371 (c)(1),
(2), (4) Date: Jul. 16, 2002

(87) PCT Pub. No.: WO02/092224

PCT Pub. Date: Nov. 21, 2002

(65) Prior Publication Data

US 2003/0104932 A1 Jun. 5, 2003

(30) Foreign Application Priority Data

May 16, 2001 (KR) .............................. 10-2001-0026597

(51) Int. Cl.$^7$ ............................ B01J 27/02; B01J 27/04
(52) U.S. Cl. ....................... 502/219; 502/216; 502/217; 502/220; 502/221; 502/222; 502/223; 502/349
(58) Field of Search ................................ 502/216, 217, 502/219, 220, 221, 222, 223, 349

(56) References Cited

U.S. PATENT DOCUMENTS

| | | | |
|---|---|---|---|
| 4,759,918 A | 7/1988 | Homeier et al. | 423/213.5 |
| 4,849,399 A * | 7/1989 | Joy et al. | 502/333 |
| 4,918,041 A * | 4/1990 | Hollstein et al. | 502/217 |
| 5,000,929 A | 3/1991 | Horiuchi et al. | 423/213.5 |
| 5,214,017 A * | 5/1993 | Angstadt et al. | 502/204 |
| 5,290,530 A | 3/1994 | Muramatsu et al. | 423/239.1 |
| 5,320,998 A | 6/1994 | Horiuchi | 502/245 |
| 5,489,733 A * | 2/1996 | Soled et al. | 585/740 |
| 5,591,414 A | 1/1997 | Jacob et al. | 422/180 |
| 5,610,117 A | 3/1997 | Horiuchi et al. | 502/324 |
| 5,658,546 A | 8/1997 | Kobayashi et al. | 423/239.1 |
| 5,780,383 A * | 7/1998 | Hollstein et al. | 502/324 |
| 5,911,961 A | 6/1999 | Horiuchi et al. | 423/213.5 |
| 6,013,599 A | 1/2000 | Manson | 502/340 |
| 6,015,932 A * | 1/2000 | Frey | 585/751 |
| 6,180,556 B1 * | 1/2001 | Marella et al. | 502/217 |
| 6,448,198 B1 * | 9/2002 | Szabo et al. | 502/217 |

FOREIGN PATENT DOCUMENTS

DE 42 29 471 A1 3/1994

OTHER PUBLICATIONS

Boyse, Raymond A. and Ko, Edmond I., "Crystallization Behavior of Tungstate on Zirconia and Its relationship to Acidic Properties," Journal of Catalysis, 179: 100–110 (1998). (1).

Hua, Weiming, "Promoting Effect of Al on So4 IM$_x$O$_y$ (M=Zr, Ti, Fe) Catalysts," Journal of Catalysts, 196: 104–114 (2000). (1).

Xue, E. et al., "Pt–ZrO$_2$ Catalysts for the Oxidation of N0 and S0$_2$, Effects of Sulfate," Environmental Catalysis, Chapter 20, 250–267 (1994).

* cited by examiner

Primary Examiner—Elizabeth D. Wood
(74) Attorney, Agent, or Firm—Heller Ehrman White & McAuliffe

(57) ABSTRACT

This invention provides a new catalyst for purification of diesel engine exhaust gas comprising a carrier of at least one sulfur-resistant refractory oxide and at least one catalytic metal, wherein at least one solid acid and/or sulfuric acid is carried on the carrier by adding at least one precursor of said solid acid and/or sulfuric acid during the preparation of the carrier, and preparation thereof. The catalyst of this invention is thermally and chemically durable and can effectively remove particulate matters, hydrocarbons and nitrogen oxides contained in the diesel engine exhaust gas at low temperatures.

10 Claims, 8 Drawing Sheets

CATALYST FOR PURIFICATION OF DIESEL ENGINE EXHAUST GAS

TECHNICAL FIELD

The present invention relates to a catalyst for the purification of diesel engine exhaust gases and preparation thereof. Specifically, the present invention relates to a catalyst for the purification of diesel engine exhaust gas comprising a carrier of at least one sulfur-resistant refractory oxide and at least one catalytic metal, wherein at least one solid acid and/or sulfuric acid is carried on the carrier by adding at least one precursor of said solid acid and/or sulfuric acid during the preparation of the carrier, and preparation thereof.

BACKGROUND ART

Diesel engines are advantageous over gasoline engines in that diesel engines are much more fuel-efficient and generate much less carbon oxides than gasoline engines. But, diesel engines may generate, owing to their fuel composition and incomplete combustion due to engine strokes, gaseous waste products, hydrocarbons, carbon monoxide, and nitrogen oxides, which pose a serious health problem to the population at large.

In addition to these gaseous pollutants, diesel engines also emit "soot" particles comprising carbonaceous solids containing adsorbable hydrocarbons and inorganic compounds or very fine droplets of condensate or a agglomerates of "particulate matters". The "particulate matter" referred to herein as "diesel soot" is particularly rich in condensed polynuclear hydrocarbons, some of which have been found to be carcinogenic. Owing to these factors, many countries have promulgated strict standards to minimize the discharge of diesel soot from automotive sources into the atmosphere.

For the last 50 years, many studies have been steadily and extensively carried out in order to solve the above problems involving diesel soot. A post-treatment method of removing such diesel soot which consists of capturing particulate matters with a ceramic filter and then oxidizing them has been considered as the most realistic method in practice. The most important feature of such post-treatment lies in designing the filter so that it can effectively capture the diesel soot as well as in developing a catalyst, which can completely oxidize the captured diesel soot at the temperature of the gas exhausted from the diesel engine. For example, U.S. Pat. No. 4,759,918, to Homeier, et al., describes a catalytic composite, which contains Pt, Pd, or Rh as the catalytic metal and comprises a particulate filter coated with a sulfur-resistant refractory inorganic oxide selected from the group consisting of titania, zirconia, silica, silica-alumina and alumina, that has been treated to be sulfur-resistant, i.e. alumina treated with titania, zirconia, tungsten oxide, etc.

U.S. Pat. No. 5,658,546, to Kobayashi, et al., describes a denitration(deNO$_x$) catalyst excellent in denitration(deNO$_x$) activity and durability at high temperature, for catalytically reducing NO$_x$ in exhaust gas by using a reducing agent such as ammonia. This denitration(deNO$_x$) catalyst is obtained by preparing a titanium-tungsten mixed oxide (component A) by co-precipitating a soluble titanium compound and a soluble tungsten compound under specific conditions, drying and calcining the co-precipitated mixed oxide, and then depositing at least one catalytic metal (component B) selected from the group consisting of cerium (Ce), lanthanum (La), praseodymium (Pr), neodymium (Nd), nickel (Ni), and tin (Sn) on said titanium-tungsten mixed oxide.

U.S. Pat. No. 5,591,414, to Jacob, et al., describes a sorption-oxidation catalytic converter for the combined chemo-sorptive and oxidative cleaning of diesel engine exhaust gases, characterized in that the catalytic active materials consisting of a solid acid system $V_2O_5/WO_3/TiO_2/SiO_2/Al_2O_3$ is doped with platinum in the form of an oxide. In this catalyst, sulfate is contained in an amount of less than 1%, and there is no description about the effect of the sulfate to the acidity and activity of the catalyst.

Rather, DE-A42 29 471A, which is mentioned as prior art in said U.S. Pat. No. 5,591,414, describes that a titanium source can be selected from metatitanic acid, titanium sulfate, or sulfuric acid-treated titanium oxide and the difference of the titanium source does not give any difference in effects, and further the use of a sulfated titanium source cannot generate any improvement in the activity. Further, this German patent publication suggests that it is possible to use iron and vanadium in the form of their oxide or sulfates, and iron metal in its sulfate form has higher activity. However, there is no consistent tendency between the use of sulfate form and the catalytic activity, and it also fails to provide any reasonable explanation.

U.S. Pat. No. 5,911,961, to Horiuchi, et al., describe a catalyst for the purification of diesel engine exhaust gas, which uses Pt or Pd as the catalytic metal and titania or zirconia as the carrier, wherein the catalyst is a mixture of first catalyst particles and second catalyst particles, the first catalyst particles consisting of a catalytic metal and WO$_x$ carried on the first carrier particles and the second catalyst particles consisting of a catalytic metal carried on the second carrier particles.

U.S. Pat. No. 6,013,599, to Manson, describes a self-regenerating catalyst member, which may be used to remove particulate carbon and residual carbonaceous material from engine exhaust, wherein the catalyst contains at least one catalytic metal selected from a group consisting of metals of Group IB (e.g., copper), Group VIII (e.g., iron) and Group VB (e.g., vanadium). This patent describes that the use of a mixture of catalytic metal oxides may give several advantages.

Studies carried out so far show that a Pt/SiO$_2$ catalyst has good activity because it can oxidize, in an indirect manner, the soot captured on a filter using nitrogen oxides, sulfurous acid gas, water, oxygen and the like contained in the exhaust gas. However, the platinum-silica catalyst system requires a high operation temperature of 400 to 600° C. Therefore, it is necessary to develop a new catalyst, which can completely remove the particulate matter at an operation temperature lower than 300° C.

Further, many other studies also have been carried out to develop catalysts for the purification of diesel engine exhaust gas, which use platinum as the catalytic metal. From these studies, it has been considered that titania carrier can produce better results than zirconia as the carrier material, and the higher acidity in the carrier can give the higher activity of the catalytic metal, that is, platinum [See, Am. Chem. Soc. Symp. Ser., 552, 250 (1994)].

In this regard, U.S. Pat. Nos. 5,911,961 and 5,591,414 mentioned above also describe that catalysts containing a solid acid such as tungsten oxide or molybdenum oxide are improved in activity for removing nitrogenous compound and durability at high temperatures. However, they do not describe any relationship between the acidity of the carrier and the activity of the catalytic metal, and thus they provide no finding or suggestion of any other means to increase the acidity of the catalyst carrier.

Another reason that the acidity of the carrier can influence the activity of the catalytic metal lies in that there are aromatic compounds [PAH (Polycyclic Aromatic Hydrocarbon)] and particulate matters in the diesel engine exhaust gas. The aromatic compounds are of strong alkalinity, and the particulate matters have the same structure and properties as carbon black, which also have a strong alkalinity. It is believed that if the carrier has high acidity, PAH and the particulate matters can be easily adsorbed and oxidized on the carrier.

Methods to increase the acidity of the carrier material may include, for example, incorporation of a solid acid, use of sulfated titania, or the like. U.S. Pat. No. 5,591,414 describes the incorporation of a solid acid, such as $WO_3$ or $MoO_3$, and the use of sulfatized titania. However, the catalytic metal is vanadium, and platinum should be used in zero or a very small amount. Further, since the sulfate or sulfuric acid used in the preparation of titanium gel should be neutralized (to about pH 8) with ammonia, the amount of sulfate $[SO_4^{2-}]$ is very low, for example, less than 1% of the total weight of the catalyst. In addition, even if sulfated titania is present, the difference lies only in that the titanium precursor is used in a sulfate form instead of an oxide form. Although titanium sulfate is used as a precursor, theoretically, the acidity cannot increase or decrease. Thus, there is no statement in said document about the influence of the use of titanium sulfate on the acidity of the carrier prepared from titanium sulfate.

When sulfuric acid is added or impregnated directly into sulfur-resistant refractory oxide such as zirconia in order to increase the acidity of the catalyst, the sulfate or sulfuric acid on the surface of the zirconia can be easily detached by water or during the oxidation of hydrocarbon, thereby deteriorating the activity of the catalyst.

Further, the bonding between zirconium and platinum is stronger than that between titanium and platinum. When platinum as the catalytic metal is carried on a zirconia carrier, the activity on oxidation is low due to the strong bonding between platinum and zirconia The above mentioned problems make it more difficult to use sulfuric acid to increase the acidity of carriers comprising zirconia when platinum is used as the catalytic metal.

Under such circumstances, there has been no practical suggestion about a method to increase the acidity of catalyst or carrier, other than the use of a solid acid.

The inventor has extensively studied on the method to increase the acidity of a carrier by incorporating a solid acid such as tungsten oxide and/or sulfuric acid into the carrier when preparing a catalyst for the purification of diesel engine exhaust gases comprising at least one sulfur-resistant refractory oxide such as titania and at least one catalytic metal such as platinum or palladium.

Specifically, the inventor first prepared a catalyst composed of catalytic metal/tungsten oxide/titania by adding a tungsten oxide precursor and sulfuric acid to a titanium gel prepared from a titania precursor, shaping and calcining the resulted mixed gel at about 600 to 800° C. In such case, it was found that the more sulfuric acid was added, the higher acidity of the carrier was achieved to produce a catalyst metal with higher activity, that is, platinum or palladium. However, since the bonding force between the sulfate radical and the titanium atom is relatively weak, there arise problems in practice, in spite of the improvement in the acidity and activity.

However, it has been surprisingly found that, when zirconia or zirconia-based composite oxide, such as zirconia-titania composite oxide is employed as a carrier and tungsten oxide and sulfuric acid are added during the preparation of the carrier, the catalytic activity and durability of the catalyst are significantly improved without deterioration of the adhesion of the carrier particles to achieve excellent catalytic performance.

DISCLOSURE OF INVENTION

The present invention provides a catalyst for purification of exhaust gas comprising a sulfur-resistant refractory oxide and a catalytic metal such as platinum or palladium, wherein the activity is improved by increasing the acidity of the sulfur-resistant refractory oxide by carrying a solid acid and sulfuric acid thereon without deteriorating the adhesion of the catalyst particles, in order to improve the oxidation of soot including PAH and particulate materials.

Therefore, the first object of the present invention is to provide a catalyst for the purification of exhaust gas, comprising at least one sulfur-resistant refractory oxide as a carrier and at least one catalytic metal, wherein at least one solid acid and sulfuric acid are carried on the carrier.

The second object of the present invention is to provide a catalyst for the purification of exhaust gas comprising a ziconia-based composite oxide as a carrier and at least one catalytic metal, wherein the carrier contains at least one solid acid.

The third object of the present invention is to provide a method for the preparation of a catalyst for the purification of exhaust gas comprising at least one sulfur-resistant refractory oxide as a carrier and at least one catalytic metal, wherein at least one solid acid and sulfuric acid are carried on the carrier, the method comprising:

(1) preparation of a solution of at least one sulfur-resistant refractory oxide precursor, (2) addition of an alkali solution such as an aqueous ammonia solution to co-precipitate and to form a gel or a mixed gel thereof, (3) drying, shaping and calcining of the resultant gel or mixed gel, (4) deposition of at least one catalytic metal, characterized in that (a) at least one solid acid precursor or its solution is added before or after the co-precipitation of said step (2), and (b) sulfuric acid is added after the co-precipitation of said step (2).

In the present invention, the sulfur-resistant refractory oxide includes, for example, silica, silica-alumina, titania ($TiO_2$), zirconia ($ZrO_2$), tin oxide ($SnO_2$), zirconia-silica composite oxide, zirconia-titania ($ZrO_2$-$TiO_2$) composite oxide, zirconia-tin oxide ($ZrO_2$-$SnO_2$) composite oxide, tin oxide-titania ($SnO_2$-$TiO_2$) composite oxide, zeolite, modenite, or their mixtures, and preferably includes zirconia or zirconia-based composite oxide such as zirconia-silica composite oxide and zirconia-titania composite oxide.

According to one preferred embodiment of the present invention, the sulfur-resistant refractory oxide may be a zirconia-based composite oxide. Although the ratio of zirconia in the zirconia-based composite oxide is not particularly limited, it is generally contained in an amount not less than 2% by weight, preferably not less than 5% by weight, more preferably not less than 10% by weight, particularly not less than 30% by weight in the composite oxide. For example, the ratio of zirconia to titania in a zirconia-titania composite oxide may be generally 2:98 to 98:2, preferably 10:90 to 90:10, and more preferably 30:70 to 70:30 by atomic ratio.

In the context of the present invention, the term "mixed oxide or composite oxide" means that two or more oxides are homogeneously mixed on the level of molecules, which may be prepared by co-precipitating the mixture of the precursors of two or more oxides by gel-sol preparation. The term "oxide mixture" means that the particles of two or more oxides are mixed on the level of particles.

In the present invention, examples of said solid acid include oxides of tungsten such as tungsten dioxide ($WO_3$) and oxides of molybdenum such as molybdenum trioxide ($MoO_3$). Although the contents of solid acid to be used is not particularly limited, it is generally contained in an amount of 1 to 90% by weight and preferably 10 to 40% by weight based on the total amount of the refractory oxide and the solid acid.

According to a preferred embodiment of the present invention, the addition of oxides of silicon, aluminum, iron, tin and/or cerium or their analogs to the carrier may modify or improve the physical properties of the catalyst, such as surface area and particle size or thermal properties. It is also possible to add and co-precipitate the precursors of these "silicon, aluminum, iron, tin and/or cerium oxides or their analogs" during the preparation of the carriers. It is preferable for these additive elements as mentioned above to be present in the form of composite oxide with the carrier and in an amount of generally 1 to 100% by weight based on the amount of zirconia of zirconia-based composite oxide.

For reference, it can be noted that articles by Raymond A. Boyse et al., *J Catal.*, 179, 100–110(1998) and Weiming Hea et al., *J. Catal.*, 196, 104–114(2000) describe catalysts for the isomerization of n-butane, in which addition of other components such as the above-mentioned additive elements to a catalyst carrier can give no favorable effects but rather an inhibitory effect in increasing the acidity of the carrier, although the surface area and thermal stability of the carrier are significantly improved.

According to the present invention, the content of sulfuric acid contained in the resultant catalyst is not particularly limited and may be generally in an amount of 0.5 to 15% by weight, preferably 0.5 to 10% by weight based on the amount of refractory oxide after calcination of the catalytic composition. The amount contained in the resulting catalyst can be adjusted by a person having ordinary skill in the art by selecting the amount of sulfuric acid to be added and the appropriate calcining conditions, such as temperature and time period.

In the present invention, the catalytic metals are not critically limited and may be selected from a group consisting of platinum (Pt), paladium (Pd), rhodium (Rh), ruthenium (Ru), rhenium (Re) and their mixtures. The amount of catalytic metals to be deposited on a carrier is not critically limited and may be generally 0.01 to 10% by weight based on the total amount of the carrier.

Preparation of the Catalyst of the Present Invention

The carrier and catalyst according to the present invention may be prepared by a common sol-gel method as described hereinbelow or any other methods.

The precursors of the refractory oxides (hereinafter, referred to as "refractory oxide precursor" or "carrier precursor") used in the present invention are selected from compounds that can be transformed into their oxides at a temperature within the range of their calcination temperatures and that can form a solution or dispersion in a suitable solution (hereinafter, referred to as "refractory oxide precursor solution" or "carrier precursor solution") when applied in the sol-gel method. Examples of such compounds include acids, such as titanic acid, zirconic acid, stannic acid, silicic acid, and the like; hydroxides such as $Ti(OH)_4$, $Zr(OH)_4$, and the like; halides, such as $TiC_4$, and the like; and sulfates, such as titanium sulfate, zirconium sulfate, titanyl sulfate, zirconyl sulfate, and the like; and their mixtures or analogues. It is also possible to use an organic precursor, such as alkoxides, for example, $Ti(OR)_4$ and $Zr(OR)_4$ wherein R independently represents $C_1$~$C_6$ alkyl groups such as n-propyl or iso-propyl.

The precursors of solid acids (hereinafter, referred to as "solid acid precursor") are also selected from compounds that can be transform into solid acid such as tungsten oxide at a temperature within the range of the calcination temperatures and that can form a solution or dispersion in a suitable solution (hereinafter, referred to as "solid acid precursor solution") when applied in the sol-gel method. Examples of such compounds include acids, such as tungstic acid, hydroxide, alkoxide, halides and sulfates of tungsten, ammonium tungstate, and their mixtures or analogues. A solid acid precursor such as tungsten hydroxide may be used in a solution in sulfuric acid.

Said carrier precursors are dissolved in water to be converted to their hydroxides [e.g., $Ti(OH)_4$, $Zr(OH)_4$], which are then neutralized and precipitated with an alkali such as ammonia to form gels or mixed gels thereof. When organic carrier precursors, such as $Ti(OR)_4$, and $Zr(OR)_4$, wherein R independently represents $C_1$~$C_6$ alkyl groups such as n-propyl or iso-propyl are used, they are dissolved in alcohol, which are then neutralized and precipitated with an alkali such as ammonia to form gels or mixed gels thereof.

The present invention also provides a process for the preparation of a catalyst comprising a carrier of sulfur-resistant refractory oxide or its composite oxide and catalytic metals, the process comprising the following steps:

(1) preparing a solution of at least one sulfur-resistant refractory oxide precursor, (2) adding an alkaline solution such as an aqueous ammonia solution to be co-precipitated and to form a gel or a mixed gel thereof, (3) drying, shaping and calcining the resultant gel or mixed gel, and (4) depositing at least one catalytic metal;

characterized in that (a) at least one solid acid precursor or its solution is added before or after the co-precipitation of said step (2), and (b) sulfuric acid is added after the co-precipitation of said step (2).

The process comprising said steps (1) to (4) is well known in the field as the sol-gel preparation, and its preparation conditions are well discussed in the above-mentioned prior art.

According to a preferred embodiment of the present invention, the process comprises adding slowly an aqueous ammonia solution into the refractory oxide precursor solution to be co-precipitated into a gel or a mixed gel, which is then filtered, dried and added to a solution, in which at least one solid acid precursor is dissolved in sulfuric acid, removing the solvent by filtering, drying, shaping and calcining the resulting mixture of the mixed gel of the refractory oxide precursors and the solid acid precursors with sulfuric acid.

The process of preparing the carrier comprising the sulfur-resistant refractory oxide is further described in detail by an exemplary case of using zirconium oxide as the carrier and tungsten oxide as the solid acid.

(1) Preparation of Zirconium Gel as the Carrier Precursor

Zirconium gel can be prepared according to the sol-gel preparation as follows: At least one zirconium oxide precursor such as zirconium nitrate or zirconium propoxide is dissolved in a suitable solvent such as water or alcohol to prepare a carrier precursor solution. By slowly adding an aqueous ammonia to this solution, the precursor is converted to zirconium hydroxide ($Zr(OH)_4$), which is precipitated to form a gel. Then, thus obtained precipitated gel may be filtered, washed several times with distilled water to remove chloride and nitrate, and dried to yield a gel (hereinafter, referred to as "zirconium gel").

When an organic compound such as zirconium propoxide ($Zr\text{-}(OC_2H_7)_4$) or the like is employed as a precursor, it is preferably dissolved in alcohol.

(2) Loading of Tungsten Oxide Precursor and Sulfuric Acid (a) Loading of Tungsten Oxide Precursor Tungsten oxide precursor can be loaded or incorporated into the carrier precursor before or after the precipitation of the carrier precursor, that is, a gel forming step.

Before the gel forming step, the tungsten oxide precursor or its solution can be added into a zirconium oxide precursor solution to form a mixed solution of zirconium oxide precursor and the tungsten oxide precursor, which is then subjected to co-precipitation with an alkali to form a zirconium-tungsten mixed gel. In such case, it is possible to preform a hydrothermal treatment, if necessary.

After the gel forming step, the tungsten oxide precursor or its solution can be added into a zirconium gel after an optional filtering and drying treatment. The resultant mixed solution of zirconium gel and the tungsten oxide precursor is then subjected to an incipient wetness method, in which the tungsten oxide precursor is absorbed into the zirconium gel as the solvent is slowly removed by evaporation or distillation to form a zirconium gel containing the tungsten oxide precursor.

(b) Loading of Sulfuric Acid

Sulfuric acid is incorporated into a carrier precursor after the zirconium gel forming step.

Sulfuric acid can be added into the zirconium-tungsten gel or the zirconium gel containing the tungsten oxide precursor. The sulfuric acid can be added, after the gel forming step for zirconium gel, preferably together with the tungsten oxide precursor. A sulfuric acid solution, into which the tungsten oxide precursor is dissolved, can be preferably used.

The added sulfuric acid can be absorbed into the gel by an incipient wetness method by removing the solvent as described above.

Sulfuric acid used in the present invention can be fumed sulfuric acid or a diluted sulfuric acid in any concentration. Although the amount of sulfuric acid to be added is not specifically limited, it may be added in an amount of 1 to 100 parts by weight based on 100 parts by weight of the carrier gel.

(3) Drying, Shaping and Calcination of the Carrier

The carrier zirconium gel, zirconium-tungsten mixed gel or zirconium gel containing tungsten oxide precursor, into which sulfuric acid is loaded, can be dried, shaped and calcined by common methods known in this field.

Drying may be carried out at 100 to 140° C. for 5 to 24 hours, and calcination may be carried out at 400 to 1000° C. and for 1 to 10 hours. Suitable temperature and time period for these processes can be appropriately selected by a person having ordinary skill in the art.

(4) Deposition of Catalytic Metals

Catalytic metals used in the present invention can be deposited by a common process for depositing metal on a carrier.

Specifically, a catalytic metal such as palladium or platinum can be deposited on a carrier by adding a precursor or its solution of the catalytic metal into the gel obtained as above and then drying and calcining. The incipient wetness method may be carried out before the calcination step when necessary.

Alternatively, the catalytic metals can be deposited on a carrier by calcining the precursor gel to prepare a carrier, to which at least one precursor or its solution of the catalytic metals is impregnated and then again calcined. Impregnation may be carried out in the incipient wetness method described above.

The temperature and time period for the drying and calcining processes may be suitably selected by a person having ordinary skill in the art. For example, the carrier, to which a catalytic metal precursor solution has been impregnated may be dried at 100 to 140° C. for 5 to 24 hours and calcined at 300 to 500° C. for 1 to 5 hours.

Meanwhile, carriers used in the present invention may have a particle size of 0.01 to 10 μm and a specific surface of 70 to 200 m$^2$/g. The particle size of carriers can be adjusted by a common method and is not critical in the present invention.

According to the present invention, a catalyst having a solid acid such as tungsten oxide and/or sulfuric acid impregnated therein and composed of refractory oxides as a carrier may generally present better effects so that the temperature for oxidizing carbon black and hydrocarbons is significantly decreased, and the activity for removing nitrogen oxides is higher than a conventional catalyst. It is believed that sulfuric acid and the solid catalyst such as tungsten oxide incorporated or impregnated into the carrier can act as a sort of solid superacid on the surface of the refractory oxide such as zirconia or zirconia-titania composite oxide to promote the activation of catalytic metals as the main catalytic elements and to facilitate the adsorption of carbon black and hydrocarbons, which can improve the oxidizing ability and help the reduction of the nitrogen oxides.

According to the present invention, better improvement in catalytic activity can be achieved by using zirconia or zirconia-based composite oxide as the refractory oxide than using titania or silica. The reason is not clear but can be explained without limiting the scope of the present invention as follows:

In general, it has been recognized that titania is superior over zirconia as a catalyst carrier in view of the catalytic activity, stability and durability of the final catalyst. Some articles reported that an improvement of the catalytic activity may be achieved by incorporating a solid acid such as tungsten oxide and molybdenum oxide into a carrier comprising silica, titania or the like.

Meanwhile, the use of zirconia-titania composite oxide as a catalyst carrier is suggested in U.S. Pat. No. 5,000,929, U.S. Pat. No. 5,290,530, U.S. Pat. No. 5,320,998 and U.S. Pat. No. 5,610,117, wherein catalysts do not relate to the purification of exhaust gas and thus do not use platinum as the catalytic metal. Further, although there are disclosed a few catalyst in which platinum is carried on a mixture of zirconia and titania, the mixture of zirconia and titania is different from zirconia-titania composite oxide.

Consequently, there could not be found any catalyst in which platinum as a catalytic metal is deposited on a carrier made of zirconia-titania composite oxide. Further, there also could not be found any catalyst carrier in which tungsten oxide is employed in the form of zirconia-titania-tungsten oxide composite oxide nor any catalyst carrier comprising both tungsten oxide and sulfuric acid carried on the sulfur-resistant refractory oxide.

The present inventor has found that a significant improvement on the catalytic activity can be achieved when a zirconia carrier contains tungsten oxide as a solid acid, although not so much improvement can be achieved when titania carrier contains tungsten oxide as a solid acid.

When sulfuric acid is added during the preparation of a titania carrier, it may be assumed that the sulfuric acid is present in the form of sulfated titania, that is, titanium sulfate or titanyl sulfate in the resulting catalyst carrier. However, in the form of titanium (or titanyl) sulfate, the chemical bonding force between the titanium atom and the sulfate group is very weak, and the sulfate can be detached at a high temperature. Furthermore, an increase of the amount of titanium (or titanyl) sulfate may increasingly weaken the adhesion of the carrier particles, causing problems in practical use.

In contrast, when sulfuric acid is added during the preparation of a zirconia carrier, it has been found that, as different from the case of the titania carrier, the activity of the catalyst can be significantly improved without decreasing the adhesion of the catalyst particles. Further, sulfuric acid and tungsten oxide or its precursor are added during the preparation of the zirconia carrier, much higher acidity of the catalyst can be obtained and then more catalytic activity can be achieved.

Further, when sulfuric acid and tungsten oxide are added during the preparation of a zirconia-based composite oxide carrier such as zirconia-titania composite oxide, a still higher improvement can be achieved due to zirconia, without deteriorating the adhesion of the catalyst particles in spite of the presence of the sulfuric acid and titania.

For example, it is found that, when sulfuric acid is carried on a carrier made of zirconia-titania composite oxide, the adhesion of the catalyst particles is not damaged by the presence of titania and sulfuric acid, and the improvement of the catalytic activity is greater. It is assumed that the sulfate (or sulfuric acid) is essentially bonded to the zirconia molecule and the resulting sulfate (or sulfuric acid) bonded to zirconia can bring its acidic effect to neighboring titania molecules since the zirconia and titania molecules are present in the form of composite oxide, not in a mixture of their oxide particles. Thus, much more improvement of the catalytic effect of the catalytic metal can be achieved.

Therefore, sulfur-resistant refractory oxide used as carrier according to the present invention is preferably selected from zirconia or zirconia-based composite oxide such as zirconia-titania composite oxide.

Meanwhile, it is also found that zirconia-based composite oxide such as zirconia-titania composite oxide can improve the catalytic activity only by adding a solid acid such as tungsten oxide without sulfuric acid, but other refractory oxides, such as silica, alumina, and so on, cannot. Although the reason is not clear, it seems to be due to the high acid-resistance of the zirconia.

Therefore, according to one preferred embodiment of the present invention, it is possible to use a carrier composed of a zirconia-based composite oxide without carrying sulfuric acid thereon, for example, a carrier composed of zirconia-titania composite oxide and tungsten oxide without sulfuric acid.

In the present invention, it is unclear in which form the added sulfuric acid is present in the final catalytic composition. In any way, it is assumed that the added sulfuric acid or its sulfate radical is connected to the zirconium atom to form a strong complex of zirconia-sulfate (or zirconia-sulfuric acid) and increases the acidity of the refractory oxide carrier to enhance the activity of the catalyst.

It is believed that this phenomenon of achieving such high activity of the present invention is different from the phenomenon that sulfate or sulfite produced by oxidation of sulfur dioxide originated from the sulfur-containing compound in the fuel is adsorbed onto the surface of the catalyst to increase the acidity.

According to prior art concerning such phenomenon, the adsorbed sulfate or sulfite weakly combines with the refractory oxide to make the carrier acidic. However, when the carrier is based on silica, alumina or titania, the adsorbed sulfate or sulfite, or the acidity increased thereby would decrease the catalytic activity. Thus, some studies have concentrated their efforts on developing a catalyst showing an extremely reduced activity in oxidizing the sulfur-containing materials in the fuel to sulfate or sulfite.

Considering the above cases, it is very surprising that the activation temperature of the catalyst containing a solid catalyst such as tungsten oxide and sulfuric acid on the catalyst carrier is lowered when the solid acid precursor and sulfuric acid are added during the preparation of the carrier.

The present invention has the following features:

(1) it is possible to provide a solid superacid carrier having excellent thermal and chemical properties and catalytic activity to remove particulate matters, hydrocarbons and oxides of nitrogen as compared with any conventional carrier;

(2) it is possible to provide a catalyst that can facilitate oxidation of $SO_2$ and nitric oxides, which are known to serve as a catalyst aid in the oxidation of particulate materials;

(3) it is possible to provide a catalyst that can facilitate the adsorption and the oxidation of hydrocarbons contained in particulate matters [e.g., soot and PAH (poly aromatic hydrocarbon)] and gases in diesel engine exhaust gas; and (4) it is possible to provide a catalyst that shows an excellent performance to remove oxides of nitrogen by using as a reducing agent hydrocarbon contained in the diesel engine exhaust gas.

The catalyst prepared according to the present invention is durable thermally and chemically and has an excellent activity to oxidize carbon black and hydrocarbons at a temperature of 200 to 350° C., which is significantly lower than that in conventional technology, and an excellent activity to reduce oxides of nitrogen at a temperature of 220 to 240° C. which is also significantly lower than that in conventional technology.

The catalyst and carrier of the present invention for the purification of exhaust gas can be used for diesel engines as well as other internal combustion engines.

BEST MODE FOR CARRYING OUT THE INVENTION

Figure 1:
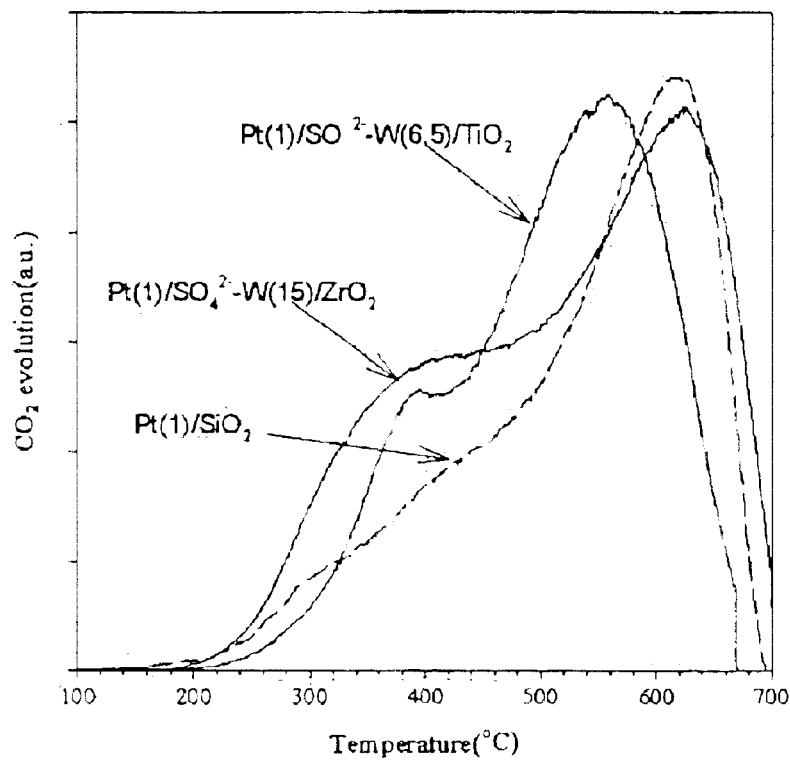
FIG. 1 is a graph showing the activities of an inventive catalyst [Pt(1)/W(15)-$SO_4^{2-}$/$ZrO_2$] and an inventive catalyst [Pt(1)/W(6.5)—$SO_4^{2-}$/Ti)$_2$] compared with that of a conventional catalyst [Pt(1)/$SiO_2$].

The present invention will now be described in detail with the aid of several specific but nonlimiting embodiments in reference to FIGS. 1 through 13 attached herewith.

EXAMPLES

First, the preparation of the catalyst for purifying diesel engine exhaust gas is illustrated.

Preparation Example 1

Preparation of the Catalyst by using Zirconia-Titania composite Oxide containing Tungsten Oxide (Pt/WO$_3$/ZrO$_2$-TiO$_2$)

(1) Preparation of Zirconium-Titanium Mixed Gel

In 700 ml of ethanol were dissolved zirconium propoxide (Zr(OC$_3$H$_7$)$_4$ and titanium propoxide (Ti(OC$_3$H$_7$)$_4$) in an amount of 0.5 mol each under stirring to prepare a homogeneous solution. To this solution, an aqueous ammonia solution was added dropwise under stirring to co-precipitate Zr(OH)$_4$ and Ti(OH)$_4$ and to form a gel, which was filtered, washed several times with distilled water, dried at about 110° C. for 12 hours to obtain a zirconium-titanium mixed get [Zr(OH)$_4$-Ti(OH)$_4$].

(2) Loading of Tungsten

To 4 g of zirconium-titanium mixed gel [Zr(OH)$_4$-Ti(OH)$_4$] obtained above was added each solution prepared by dissolving 0.273 g, 0.693 g and 1.68 g, respectively, of ammonium metatungstate [(NH$_4$)$_6$W$_{12}$O$_{39}$] in 4 ml of distilled water, which was absorbed into the gel by gradually removing the solvent (incipient wetness method). The resulted mixture was dried at 110° C. for 12 hours and was subjected to oxidation at 700° C. for 3 hours.

The carriers obtained as above contain tungsten in the amount of 6.5%, 15% and 30% by weight, respectively, based on the total weight of the carrier, and the specific surface thereof ranges between 70 and 200 m$^2$/g with a slight variation depending on the contents of tungsten and the calcining temperature.

The carriers thus obtained are referred to as W(6.5)/ZrO$_2$-TiO$_2$, W(15)/ZrO$_2$-TiO$_2$ and W(30)/ZrO$_2$-TiO$_2$, respectively.

(3) Deposition of Catalytic Metal

To 3 g of the carrier [W(6.5)/ZrO$_2$-TiO$_2$] obtained in the above step (2), 1.45 g (corresponding to the amount necessary for depositing 1% by weight of platinum) of an aqueous solution prepared by dissolving 2.7 Pt % by weight of Pt(NH$_3$)$_x$(NO$_2$)$_2$ in 4 ml of distilled water, which was absorbed into the carrier by gradually removing the solvent (incipient wetness method). The resulted carrier was dried at 110° C. for 12 hours and was subjected to oxidation at 500° C. for 3 hours to obtain a catalyst, in which platinum is deposited in the amount of 1% by weight [hereinafter, referred to as Pt(1)/W(6.5)/ZrO$_2$-TiO$_2$].

The same procedure could yield catalysts [Pt(1)/W(15)/ZrO$_2$-TiO$_2$] and [Pt(1)/W(30)/ZrO$_2$-TiO$_2$], respectively.

Preparation Example 2

Preparation of the Catalyst by using Zirconia-Titania composite Oxide containing Tungsten Oxide and Sulfuric Acid (pt/SO$_4^{2-}$—WO$_3$/ZrO$_2$-TiO$_2$)

(1) Preparation of Mixed Gel and Loading of Tungsten

Aqueous solutions were prepared by dissolving 0.693 g and 1.68 g of ammonium metatungstate (NH$_4$)$_6$W$_{12}$O$_{39}$ in 4 ml of 1 M sulfuric acid (H$_2$SO$_4$) instead of distilled water. Thus obtained tungsten precursor solution containing sulfuric acid was added to the zirconium-titanium mixed gel obtained in the above Preparation Example 1 (1) and was absorbed into the gel by gradually removing the solvent (incipient wetness method). The resulted mixture was dried at 110° C. for 12 hours and was subjected to oxidation at 700° C. for 3 hours.

The carriers obtained as above contain tungsten in the amount of 15% and 30% by weight, respectively, based on the total weight of the carrier. The content of sulfuric acid thereof is approximately from 1 to 5% by weight.

The carriers thus obtained are referred to as SO$_4^{2-}$-W(15)/ZrO$_2$-TiO$_2$ and SO$_4^{2-}$-W(30)/ZrO$_2$-TiO$_2$, respectively.

(3) Deposition of Catalytic Metal

To deposit platinum, the same procedure as in Preparation Example 1 was repeated to obtain catalyst compositions

[Pt(1)/SO$_4^{2-}$-W(15)/ZrO$_2$-TiO$_2$] and [Pt(1)/SO$_4^{2-}$-W(30)/ZrO$_2$-TiO$_2$] respectively, on which 1% by weight of platinum was deposited.

Preparation Example 3

Preparation of the Catalyst by using Titania containing Tungsten Oxide and Sulfuric Acid (Pt/SO$_4^{2-}$-WO$_3$/TiO$_2$)

According to the same procedure as in Preparation Example 1, a titania gel was prepared. To 4 g of thus obtained gel was added an aqueous solution prepared by dissolving 0.273 g of ammonium metatungstate in 4 ml of 1 M sulfuric acid solution, which was absorbed into the gel by gradually removing the solvent to obtain a titania carrier containing 6.5% by weight of tungsten and sulfuric acid. On the titania carrier thus obtained, platinum was deposited to obtain a catalyst [Pt(1)/SO$_4^{2-}$-W(6.5)/TiO$_2$], which contained 1% by weight of platinum deposited thereon and 65% by weight of tungsten.

Preparation Example 4

Preparation of the Catalyst by using Zirconia containing Tungsten Oxide and Sulfuric Acid (Pt/SO$_4^{2-}$-WO$_3$/ZrO$_2$)

According to the same procedure as in Preparation Example 1, a zirconia gel was prepared. To 4 g of thus obtained gel was added an aqueous solution prepared by dissolving 0.693 g of ammonium metatungstate in 4 ml of 1 M sulfuric acid solution, which was absorbed into the gel by gradually removing the solvent to obtain a zirconia carrier containing 15% by weight of tungsten and sulfuric acid. On the zirconia carrier thus obtained, platinum was deposited to obtain a catalyst [Pt(1)/SO$_4^{2-}$-W(15)/ZrO$_2$], which contained 1% by weight of platinum deposited thereon and 15% by weight of tungsten.

Preparation Example 5

Preparation of the Catalyst by using Silica as a Carrier (Pt/SiO$_2$)

As a comparison of catalyst activity, a catalyst [Pt/SiO$_2$] carrying 1% by weight of platinum was prepared by carrying platinum on Davisil of 100 mesh or more and then calcining the resulted mixture according to the same method as in the above Preparation Examples.

Preparation Example 6

Preparation of the Catalysts by using Zirconia-Titania Composite Oxide having different Composition Ratio The same procedure as in Preparation Example 1 was repeated, except that 0.1 mol of zirconium propoxide (Zr(OC$_3$H$_7$)$_4$) and 0.9 mol of titanium propoxide (Ti(OC$_3$H$_7$)$_4$) were used, to prepare a zirconium titanium mixed gel having a composition ratio of Zr:Ti=1:9.

Then, according to the same procedure as in Preparation Example 1, tungsten precursor was added to the mixed gel and the resulted mixture was calcined to obtain a carrier, on which platinum was deposited to obtain a catalyst [Pt(1)/W(15)/ZrO$_2$-TiO$_2$(1:9)].

Preparation Example 7

Preparation of the Catalysts by using Zirconia-Titania Composite Oxide having different Composition Ratio The same procedure as in Preparation Example 2 was repeated, except that 0.1 mol of zirconium propoxide (Zr(OC$_3$H$_7$)$_4$) and 0.9 mol of titanium propoxide (Ti(OC$_3$H$_7$)$_4$) were used, to prepare a zirconium-titanium mixed gel having a composition ratio of Zr:Ti=1:9.

Then, according to the same procedure as in Preparation Example 2, tungsten precursor and sulfuric acid were added to the mixed gel and the resulted mixture was calcined to obtain a carrier, on which platinum was deposited to obtain a catalyst [Pt(1)/SO$_4^{2-}$-W(15)/ZrO$_2$TiO$_2$(1:9)].

[Test Method 1] Purification of Particulate Materials

The performance of the catalysts obtained as above to purify particulate matters was tested by using carbon black (cabot, vulcan XC12) as the particulate matter under reaction conditions and model atmosphere as follows:

Composition of the model atmosphere used: NO 500 ppm, SO$_2$ 50 ppm, O$_2$ 10%, H$_2$O 5%, He in balance.

Total amount of the model exhaust gas: 200 ml/min.

Amount of catalyst used: 0.2 g

Amount of carbon black used: 0.004 g (the ratio of catalyst to carbon black was 50:1)

Reaction temperature: 100~700° C.

Rate of temperature increase: 10° C./min.

All catalysts were subjected to a severity test at 500° C. for 12 hours before the activity test. In order to simulate the real conditions, the catalysts were well mixed with carbon black. The activity of the catalysts on the oxidation of carbon black was monitored by determining with a mass analyzer the amount of CO$_2$ evolved during the oxidation.

Example 1

The catalyst Pt(1)/W(15)-SO$_4^{2-}$/ZrO$_2$ prepared in Preparation Example 3 and the catalyst Pt(1)/W(6.5)—SO$_4^{2-}$/TiO$_2$ prepared in Preparation Example 4 were tested for the catalytic activities and were compared with the catalyst Pt(1)/SiO$_2$ prepared in Preparation Example 5. The results are shown in FIG. 1.

From FIG. 1, it can be seen that, when tungsten and sulfuric acid are incorporated into different carriers, the zirconia carrier shows better effects at a low temperature (ranging from about 300° C. to about 400° C.) than the titania carrier.

Example 2

The catalyst Pt(1)/WO$_3$/ZrO$_2$-TiO$_2$ prepared in Preparation Example 1 was tested for the catalytic activity on the oxidation of carbon black and was compared with the catalyst Pt(1)/SiO$_2$. The results are shown in FIG. 2.

Figure 2:
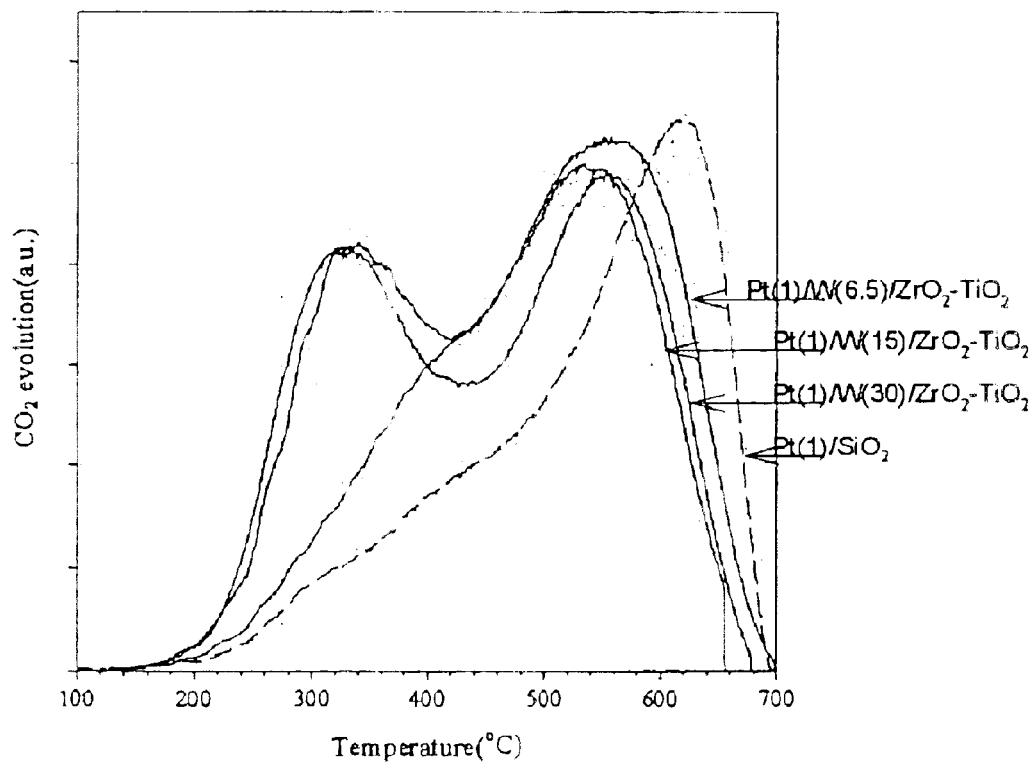
FIG. 2 is a graph showing activities on the oxidation of carbon black of inventive catalysts [Pt(1)/$WO_3$/$ZrO_2$-$TiO_2$] having various tungsten contents, compared with a conventional catalyst [Pt(1)/$SiO_2$].

From FIG. 2, it can be seen that, when the content of the tungsten is increased, the activating temperature is lowered. The catalysts containing tungsten in an amount of 15 to 30% by weight represent very high activity at a low temperature in the range of 250 to 350° C.

Example 3

The catalyst Pt(1)/WO$_3$/ZrO$_2$-TiO$_2$ having 15% by weight of tungsten prepared in Preparation Example 1 and the catalyst Pt(1)/SO$_4^{2-}$-WO$_3$/ZrO$_2$-TiO$_2$ having 15% by weight of tungsten and carrying sulfuric acid thereon prepared in Preparation Example 2 were tested for the catalytic activities on the oxidation of carbon black and were compared with the catalyst Pt(1)/SiO$_2$. The results are shown in FIG. 3.

Figure 3:
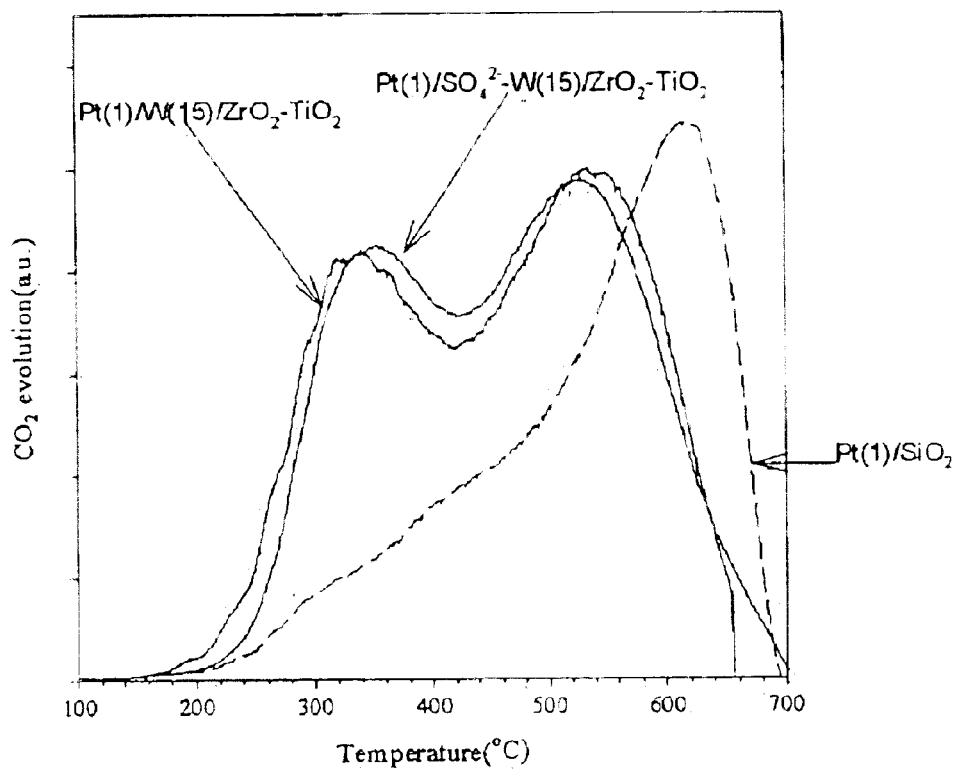
FIG. 3 is a graph showing the activities on the oxidation of carbon black of an inventive catalyst [Pt(1)/$WO_3$/$ZrO_2$-$TiO_2$] having 15 wt % of the tungsten content and of an inventive catalyst [Pt(1)/$SO_4^{2-}$-$WO_3$/$ZrO_2$-$TiO_2$] having 15 wt % of the tungsten contents and carrying sulfuric acid, compared with that of a conventional catalyst [Pt(1)/$SiO_2$].

From FIG. 3, it can be seen that the catalysts according to the present invention have much higher activities than the catalyst of comparison and have very high activities at a temperature higher than 250° C., especially around 300° C.

Example 4

The catalyst Pt(1)/WO$_3$ZrO$_2$-TiO$_2$ having 30% by weight of tungsten prepared in Preparation Example 1 and the catalyst Pt(1)/SO$_4^{2-}$-WO$_3$/ZrO$_2$-TiO$_2$ having 30% by weight of tungsten and carrying sulfuric acid thereon prepared in Preparation Example 2 were tested for the catalytic activities on the oxidation of carbon black and were compared with the catalyst Pt(1)/SiO$_2$. The results are shown in FIG. 4.

Figure 4:
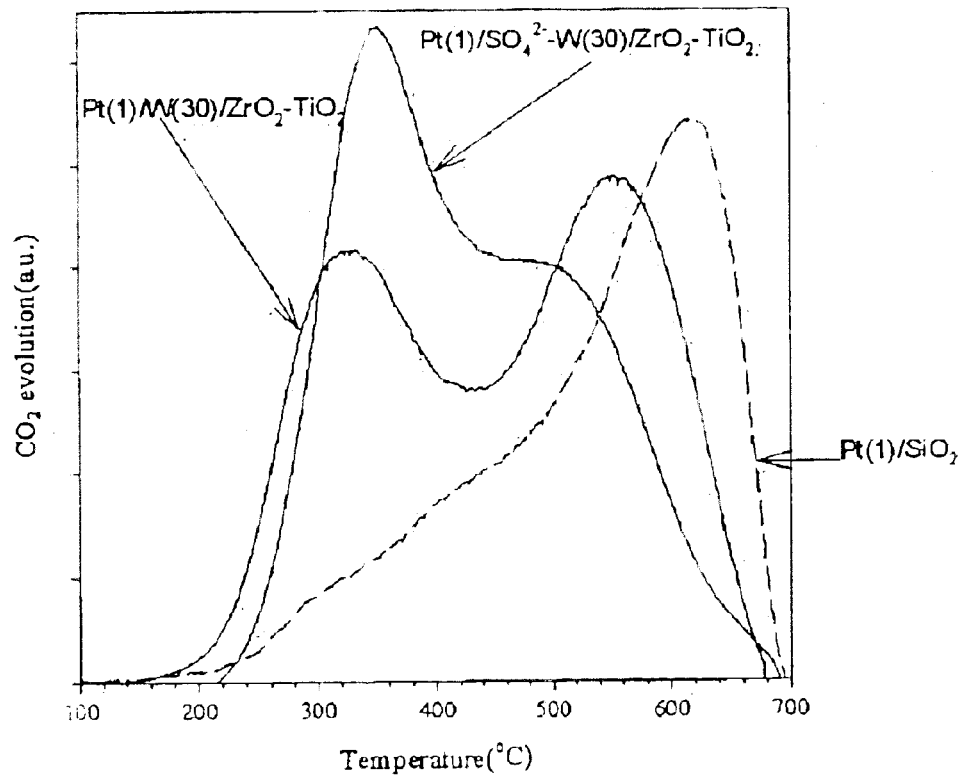
FIG. 4 is a graph showing the activities on the oxidation of carbon black of an inventive catalyst [Pt(1)/WO$_3$/ZrO$_2$-TiO$_2$] having 30 wt % of the tungsten content and an inventive catalyst [Pt(1)/SO$_4^{2-}$-WO$_3$/ZrO$_2$-TiO$_2$] having 30 wt % of the tungsten content and carrying sulfuric acid, compared with that of a conventional catalyst [Pt(1)/SiO$_2$].

From FIG. 4, it can be seen that, when the carrier of the present contains tungsten by 30 wt %, the catalyst has a better effect in oxidizing carbon black and a lower activating temperature than the catalyst of comparison, and when the carrier further contains sulfuric acid carried thereon, the improvement in the catalytic activity can be enhanced.

[Test Method 2] Purification of Hydrocarbon and Oxides of Nitrogen

The performance of the catalysts obtained in Preparation Examples 1 to 5 as above to purify hydrocarbons and oxides of nitrogen was tested under reaction conditions and model atmosphere as follows:

Composition of the model atmosphere used: C$_3$H$_6$ 1000 ppm, NO 500 ppm, SO$_2$ 50 ppm, O$_2$ 10%, H$_2$O 5%, He in balance.

Total amount of the model exhaust gas: 200 ml/min.

Amount of catalyst used: 0.2 g

Reaction temperature: 100–400° C.

Rate of temperature increase: 10° C./min.

All catalysts were subjected to a severity test at 500° C. for 12 hours under the condition and with the amount of catalyst described above before the activity test. The amounts of C$_3$H$_6$ and NO were determined with a mass analyzer.

Example 5

The catalyst Pt(1)-W(15)-SO$_4^{2-}$/ZrO$_2$ prepared in Preparation Example 3 and the catalyst Pt(1)/W(6.5)SO$_4^{20-}$/TiO$_2$ prepared in Preparation Example 4 were tested for the catalytic activities to oxidize C$_3$H$_6$ and to purify NO (nitric oxide), and were compared with the catalyst Pt(1)/SiO$_2$ prepared in Preparation Example 5.

Figure 5:
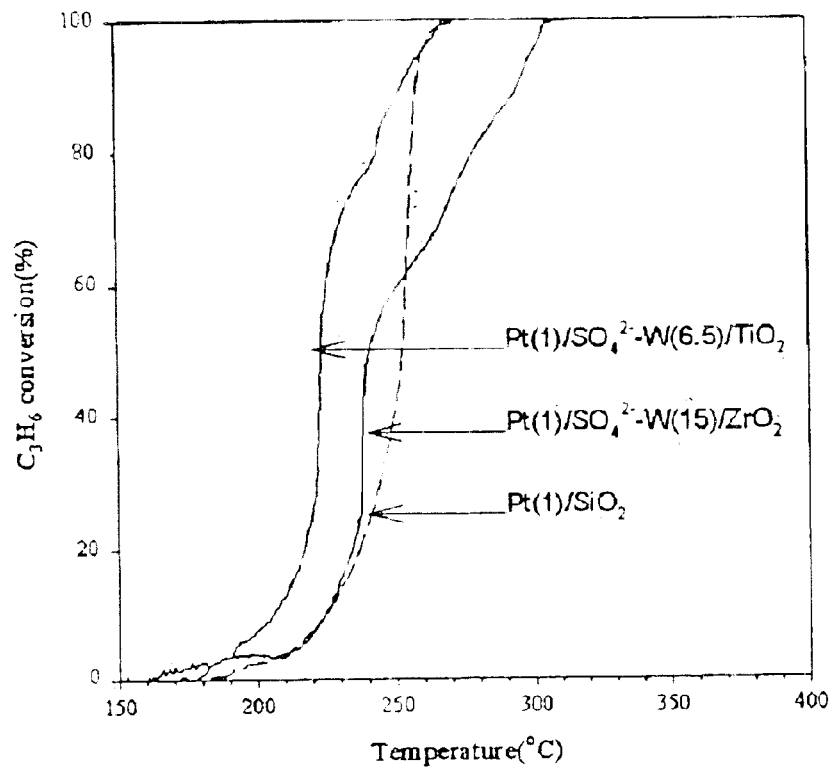
FIGS. 5 and 6 are graphs showing the activities on the oxidation of C$_3$H$_6$ and the abilities on the purification of NO (nitric oxide), respectively, of catalysts [Pt(1)/W(15)-SO$_4^{2-}$/ZrO$_2$] and [Pt(1)/W(6.5)-SO$_4^2$/TiO$_2$] compared with that of a conventional catalyst [Pt(1)/SiO$_2$].
Figure 6:
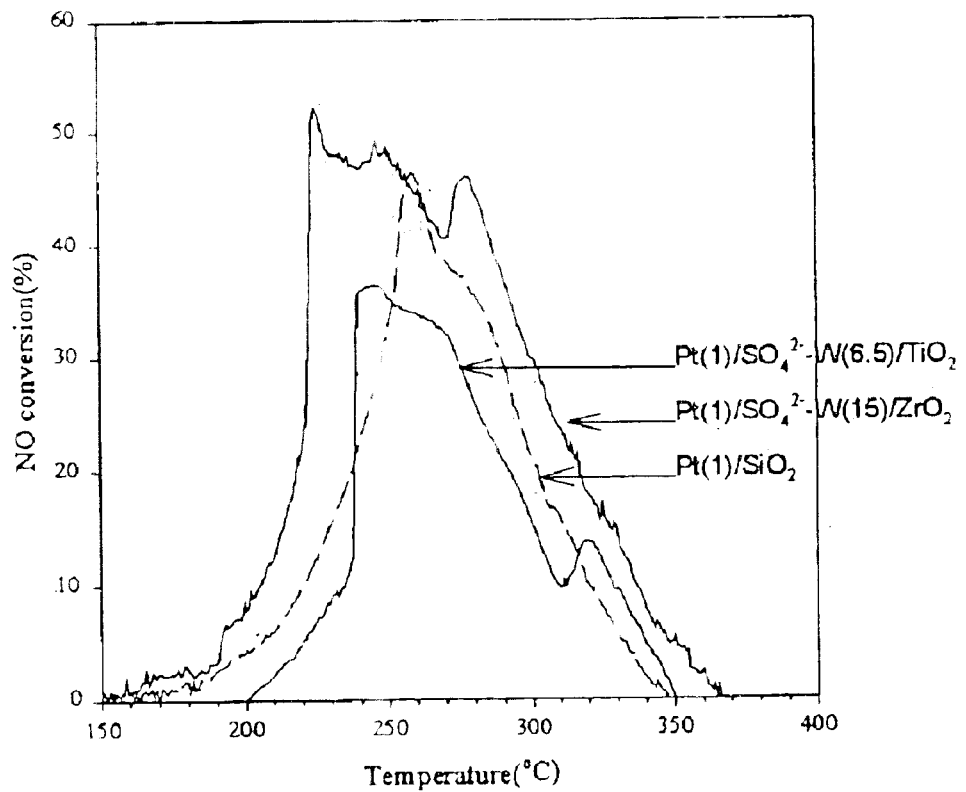

The results for the activity to oxidize C$_3$H$_6$ are shown in FIG. 5, and the results for the activity to purify NO (nitric oxide) are shown in FIG. 6.

From FIGS. 5 and 6, it can be seen that the use of tungsten and sulfuric acid carried on a zirconia or titania carrier increases the activity and decreases the activating temperature.

Example 6

The catalyst Pt(1)/WO$_3$/ZrO$_2$-TiO$_2$ having various contents of tungsten prepared in Preparation Example 1 was tested and compared with the catalyst Pt(1)/SiO$_2$.

Figure 7:
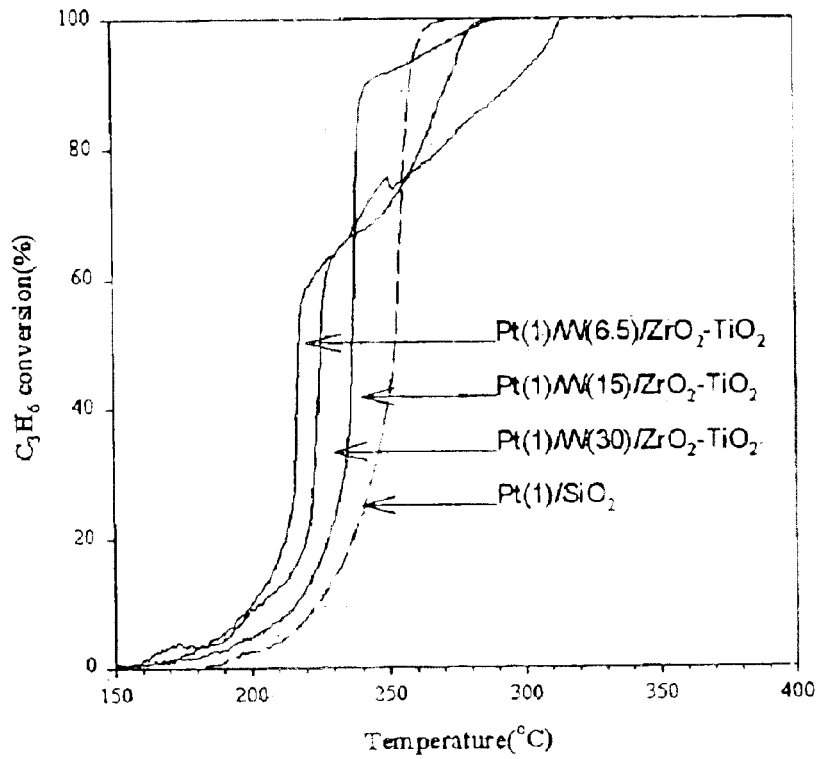
FIGS. 7 and 8 are graphs showing the activities on the oxidation of C$_3$H$_6$ and the abilities on the purification of NO (nitric oxide), respectively, of the catalysts [Pt(1)/WO$_3$/ZrO$_2$-TiO$_2$] having various tungsten contents, compared with that of a conventional catalyst [Pt(1)/SiO$_2$].
Figure 8:
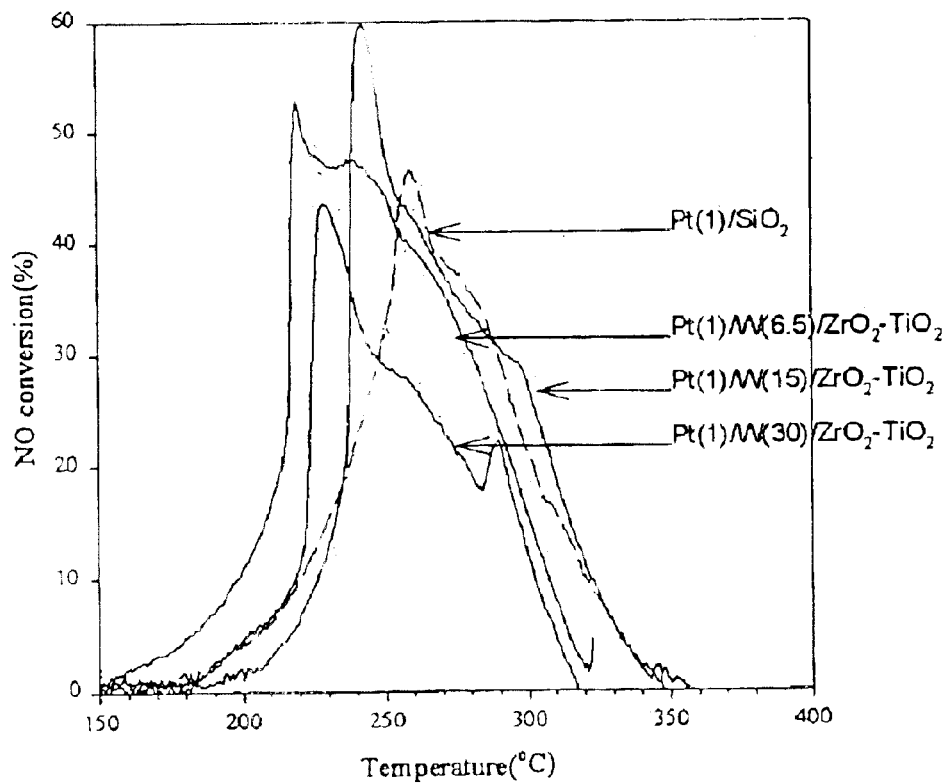

The results for the activity to oxidize C$_3$H$_6$ are shown in FIG. 7 and the results for the activity to purify NO (nitric oxide) are shown in FIG. 8.

Example 7

The catalyst Pt(1)/WO$_3$/ZrO$_2$-TiO$_2$ having 15% by weight of tungsten prepared in Preparation Example 1 and the catalyst Pt(1)SO$_4^{2-}$-WO$_3$/ZrO$_2$-TiO$_2$ having 15% by weight of tungsten and carrying sulfuric acid thereon prepared in Preparation Example 2 were tested and compared with the catalyst Pt(1)/SiO$_2$.

Figure 9:
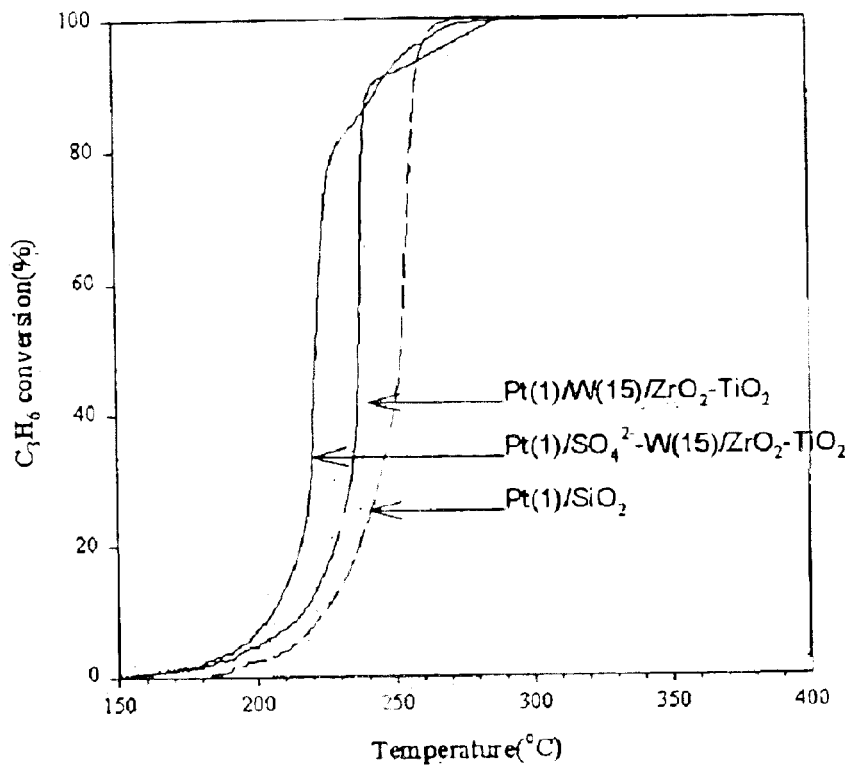
FIGS. 9 and 10 are graphs showing the activities on the oxidation of C$_3$H$_6$ and the abilities on the purification of NO (nitric oxide), respectively, of an inventive catalyst [Pt(1)/WO$_3$/ZrO$_2$-TiO$_2$] having 15 wt % of the tungsten content and carrying sulfuric acid and an inventive catalyst [Pt(1)/SO$_4^{2-}$-WO$_3$/ZrO$_2$-TiO$_2$] having 15 wt % of the tungsten contents, compared with that of a conventional catalyst [Pt(1)/SiO$_2$].
Figure 10:
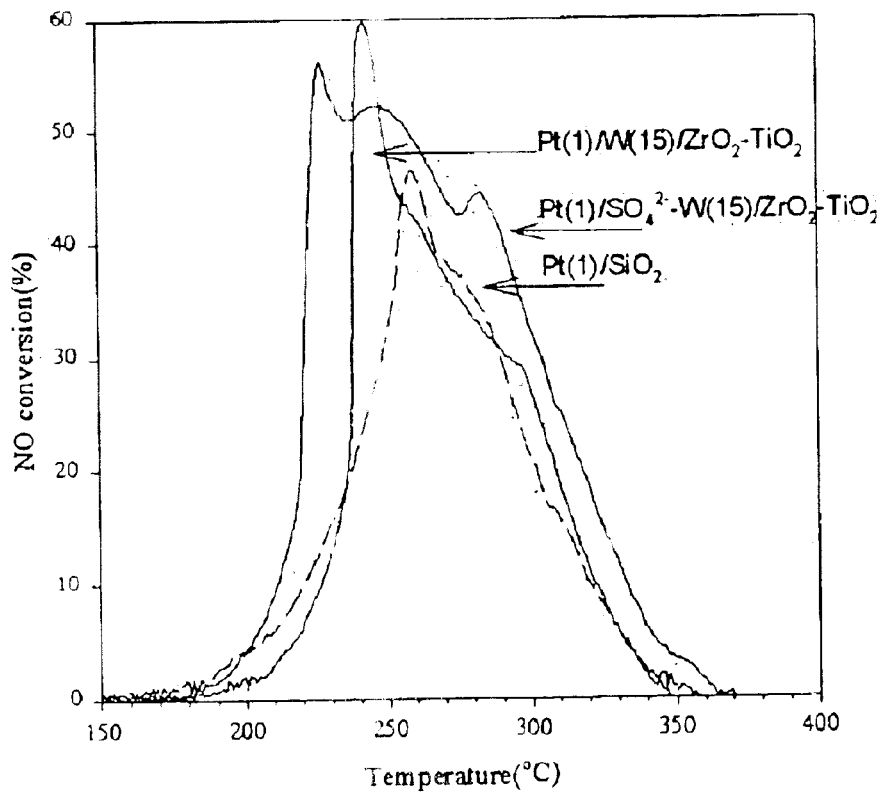

The results for the activity to oxidize CA are shown in FIG. 9 and the results for the activity to purify NO (nitric oxide) are shown in FIG. 10.

Example 8

The catalyst Pt(1)/WO$_3$/ZrO$_2$-TiO$_2$ having 30% by weight of tungsten prepared in Preparation Example 1 and the catalyst Pt(1)/SO$_4^{2-}$-WO$_3$/ZrO$_2$-TiO$_2$ having 30% by weight of tungsten and carrying sulfuric acid thereon prepared in Preparation Example 2 were tested and compared with the catalyst Pt(1)/SiO$_2$.

Figure 11:
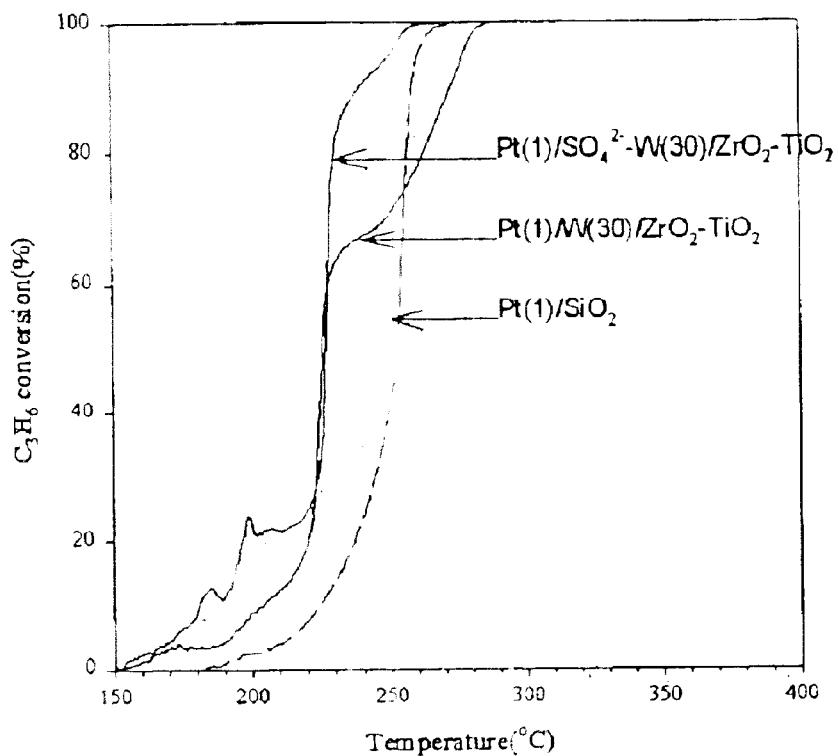
FIGS. 11 and 12 are graphs showing the activities on the oxidation of C$_3$H$_6$, and the abilities on the purification of NO (nitric oxide), respectively, of an inventive catalyst [Pt(1)/WO$_3$/ZrO$_2$-TiO$_2$] having 30 wt % of the tungsten content and carrying sulfuric acid and of an inventive catalyst [Pt(1)/SO$_4^{2-}$-WO$_3$/ZrO$_2$-TiO$_2$] having 30 wt % of the tungsten contents, compared with that of a conventional catalyst [Pt(1)/SiO$_2$].
Figure 12:
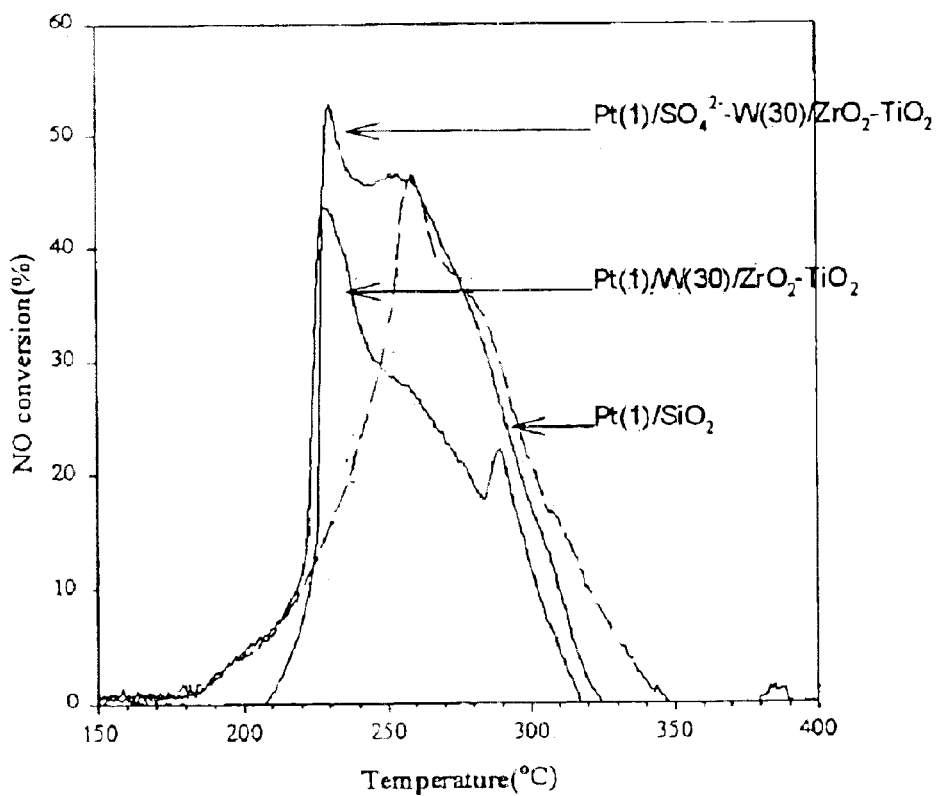

The results for the activity to oxidize C$_3$H$_6$ are shown in FIG. 11 and the results for the activity to purify NO (nitric oxide) are shown in FIG. 12.

From FIGS. 9 to 12, it can be seen that a catalyst containing tungsten and sulfuric acid carried on a zirconia-titania carrier shows a better activity on the oxidation of C$_3$H$_6$ and the purification, of oxides of nitrogen and a lower activating temperature.

Example 9

Figure 13:
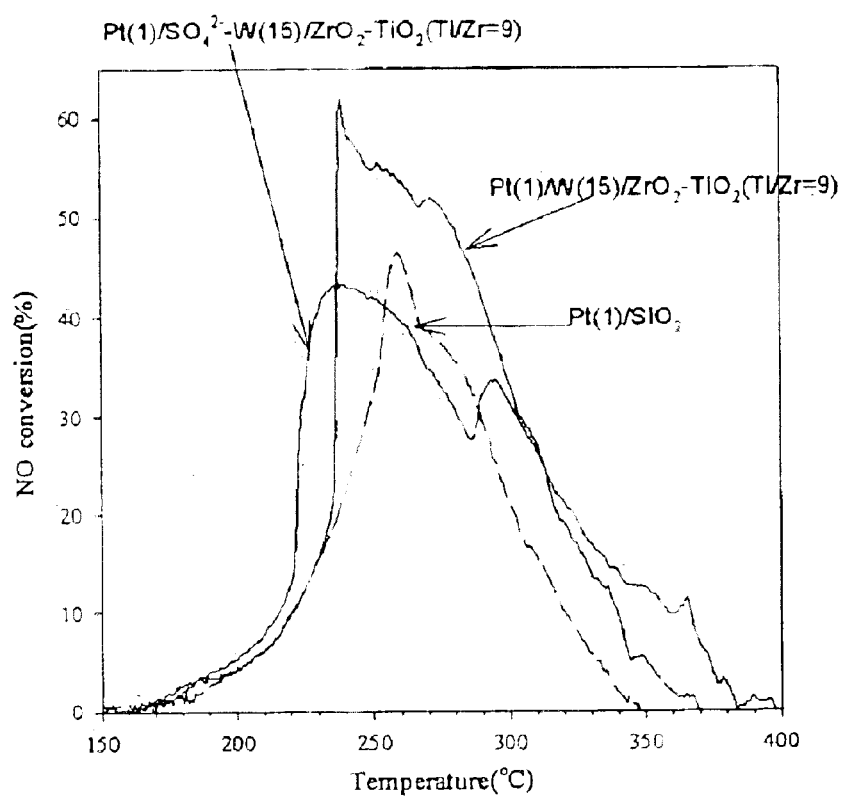
FIG. 13 is a graph showing the activities on the oxidation of carbon black of an inventive catalyst [Pt(1)/W(15)/ZrO$_2$-TiO$_2$ (Ti/Zr=9)] having 15 wt % of the tungsten content and carrying sulfuric acid and of an inventive catalyst [Pt(1)/SO$_4^{-2}$-W(15)/ZrO$_2$-TiO$_2$ (Ti/Zr=9)] having 15 wt % of the tungsten contents, compared with that of a conventional catalyst [Pt(1)/SiO$_2$].

The catalyst Pt(1)/W(15)/ZrO$_2$-TiO$_2$(Ti/Zr=9) having 15% by weight of tungsten and a composition ratio of Ti:Zr=9:1 prepared in Preparation Example 6 and the catalyst Pt(1)/SO$_4^{-2}$-W(15)/ZrO$_2$-TiO$_2$(Ti/Zr=9) having 15% by weight of tungsten and a composition ratio of Ti:Zr=9:1 and carrying sulfuric acid thereon prepared in Preparation Example 7 were tested f or the catalytic activities on the oxidation of carbon black and were compared with the catalyst Pt(1)/SiO$_2$. The results are shown in FIG. 13.

There is no significant difference in the activity to oxidize carbon black between the catalysts having tungsten with carrying sulfuric acid thereon and the catalysts having tungsten without carrying sulfuric acid thereon. The reason is probably because, owing to the relatively weak bonding force between sulfate and titania, most of the sulfuric acid added to the precursor gel has been decomposed or evaporated during the calcination at a high temperature. Therefore, carriers essentially composed of titania cannot sufficiently contain sulfuric acid or sulfate.

In contrast, a catalyst comprising a titania carrier and containing zirconia to only 10 mol % shows a superior activity on the oxidation of carbon black in a relatively low temperature range over a catalyst essentially comprising titania carrier. It is assumed that a superacid may be formed by the interaction between zirconia and tungsten and/or sulfuric acid, which may give such unexpected results.

Example 10

The catalyst Pt(1)/W(15)/ZrO$_2$-TiO$_2$(Ti/Zr=9) having 15% by weight of tungsten and a composition ratio of Ti:Zr=9:1 prepared in Preparation Example 6 and the catalyst Pt(1)/SO$_4^{-2}$-W(15)/ZrO$_2$-TiO$_2$ (Ti/Zr=9) having 15% by weight of tungsten and a composition ratio of Ti:Zr=9:1 and carrying sulfuric acid thereon prepared in Preparation Example 7 were tested and compared with the catalyst Pt(1)/SiO$_2$.

Figure 14:
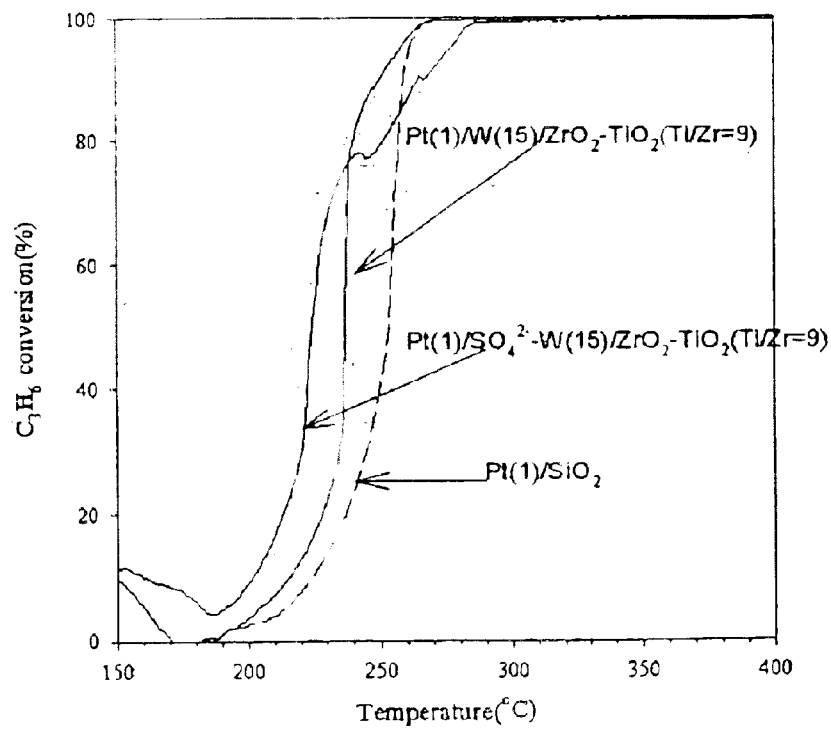
FIGS. 14 and 15 are graphs showing the activities on the oxidation of C$_3$H$_6$ and the abilities on the purification of NO (nitric oxide) of an inventive catalyst [Pt(1)/W(15)/ZrO$_2$-TiO$_2$ (Ti/Zr=9)] having 15 wt % of the tungsten content and carrying sulfuric acid and of an inventive catalyst [Pt(1)/SO$_4^{-2}$-W(15)/ZrO$_2$-TiO$_2$ (Ti/Zr=9)] having 15 wt % of the tungsten contents, compared with that of a conventional catalyst [Pt(1)/SiO$_2$].
Figure 15:
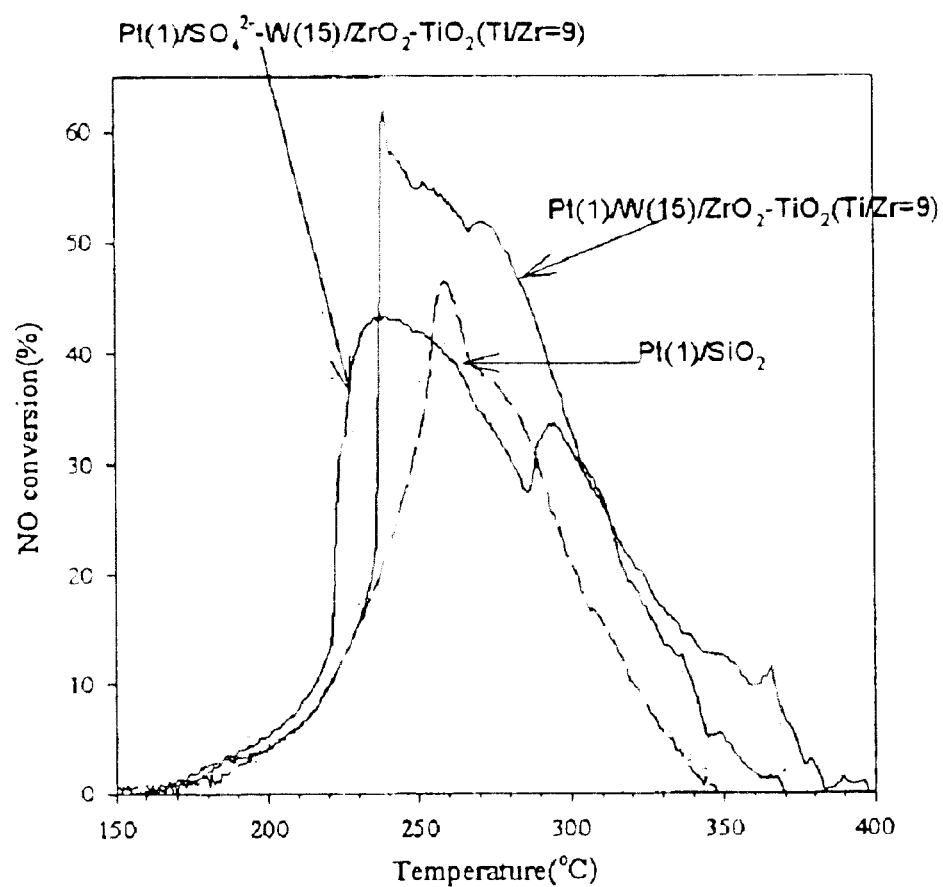

The results for the activity to oxidize C$_3$H$_6$ are shown in FIG. 14 and the results for the activity to purify NO (nitric oxide) are shown in FIG. 15.

It can be seen from FIGS. 14 and 15 that the catalyst having tungsten and carrying sulfuric acid shows a much better activity on the oxidation of $C_3H_6$ and a better activity to purify NO (nitric oxide) in a relatively low temperature range.

According to the present invention, a higher catalytic activity can be obtained when a composite oxide such as titania-zirconia is used as the carrier than when a single oxide such as zircionia or titania is used. As noted above, it is because the added sulfuric acid and tungsten oxide are combined with zironia to increase the acidity, which then influence the acidity of the neighboring titania to induce the high activity of titania.

Such phenomena and effects can appear when oxides of silicon, aluminum, iron, tin and/or cerium are mixed in the form of composite oxide with zirconia.

Among the catalysts prepared according to the present invention, the catalyst in which both sulfuric acid and tungsten oxide are carried on the zirconia or zirconia-based composite oxide show the most excellent activity on the oxidation of carbon black and hydrocarbons and on the reduction of oxides of nitrogen.

In addition, the catalyst in which tungsten oxide is carried on the zirconia-based composite oxide such as zirconia-titania composite oxide are also novel and have shown an excellent activity on the oxidation of carbon black and hydrocarbon and the reduction of oxides of nitrogen.

INDUSTRIAL APPLICABILITY

According to the present invention, it is possible to obtain a catalyst f or the purification of diesel engine exhaust gas, which is thermally and chemically durable and has an excellent activity to oxidize carbon black and hydrocarbons at a temperature of 200~350° C., which is significantly lower than that in conventional technology, and an excellent activity to reduce oxides of nitrogen at a temperature of 220~240° C., which is significantly lower than that in conventional technology.

What is claimed is:

1. A catalyst for the purification of diesel engine exhaust gas comprising at least a catalytic metal and a carrier, wherein said catalytic metal is selected from a group consisting of platinum, palladium, rhodium, ruthenium, rhenium, and their mixtures, wherein said carrier is a zirconia-titania composite oxide which comprises sulfuric acid and at least one additional solid acid selected from a group consisting of oxides of tungsten and oxides of molybdenum, and said zirconia-titania composite oxide has a ratio of zirconia to titania between 10:90 and 90:10.

2. The catalyst according to claim 1, wherein said solid acid is present in an amount of 1~90% by weight based on the total amount of said composite oxide and said solid acid.

3. The catalyst according to claim 1, wherein said sulfuric acid is present in an amount of 0.1~90% by weight based on the amount of said composite oxide.

4. The catalyst according to claim 1, wherein said catalytic metal is present in an amount of 0.01~10% by weight based on the total amount of the carrier.

5. The catalyst according to claim 1, wherein said zirconia-titania composite oxide further comprises at least one oxide selected from the group consisting of oxides of silicon, aluminum, iron, tin and cerium, in the form of a composite oxide or a mixture of oxides.

6. A process for the preparation of a catalyst for the purification of exhaust gas comprising at least a catalytic metal and a carrier as defined in claim 1, said process comprises the steps of:

(1) preparing a solution of precursors of a zirconia-titania composite oxide, (2) adding an alkali solution to co-precipitate said solution to form a mixed gel thereof, (3) drying, shaping and calcining the resulting mixed gel to form a composite oxide, (4) depositing at least one catalytic metal selected from a group consisting of platinum, palladium, rhodium, ruthenium, and rhenium;

wherein (a) at least one precursor of said additional solid acid selected from a group consisting of oxides of tungsten and oxides of molybdenum or its solution is added before or after the co-precipitation of said step (2), and (b) sulfuric acid is added after the co-precipitation of said step (2).

7. The process according to claim 6, wherein said precursor of the additional solid acid is added before the co-precipitation of step (2) to the solution of precursors of a zirconia-titania composite oxide.

8. The process according to claim 6, wherein said precursor of the additional solid acid is dissolved in sulfuric acid and the resulting mixture is added after the co-precipitation of step (2).

9. The process according to clam 6, wherein at least one precursor of oxides of silicon, aluminum, iron, tin and/or cerium is added to the solution of precursors of a zirconia-titania composite oxide before the co-precipitation of step (2).

10. The process according to claim 6, wherein said alkali solution is an aqueous ammonia solution.

* * * * *

UNITED STATES PATENT AND TRADEMARK OFFICE
CERTIFICATE OF CORRECTION

PATENT NO. : 6,855,661 B2
DATED : February 15, 2005
INVENTOR(S) : Young-Nam Kim

It is certified that error appears in the above-identified patent and that said Letters Patent is hereby corrected as shown below:

Column 18,
Line 2, "is present in an amount of 0.1 ~90% by weight" should read -- is present in an amount of 0.1 ~10% by weight --
Line 5, "is present in an amount of 0.01~10% by weight" should read -- is present in an amount of 0.01 ~90% by weight --

Signed and Sealed this

Thirty-first Day of May, 2005

JON W. DUDAS
*Director of the United States Patent and Trademark Office*